US012678968B2

(12) United States Patent
Kuk

(10) Patent No.: US 12,678,968 B2
(45) Date of Patent: Jul. 14, 2026

(54) ROBOT AND CONTROLLING METHOD THEREOF

(71) Applicant: Samsung Electronics Co., Ltd.,
Suwon-si (KR)

(72) Inventor: Junggap Kuk, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 132 days.

(21) Appl. No.: 18/603,784

(22) Filed: Mar. 13, 2024

(65) Prior Publication Data

US 2024/0217111 A1 Jul. 4, 2024

Related U.S. Application Data

(63) Continuation of application No. PCT/KR2022/013080, filed on Sep. 1, 2022.

(30) Foreign Application Priority Data

Oct. 21, 2021 (KR) .......................... 10-2021-0140975

(51) Int. Cl.
*B25J 9/16* (2006.01)
*B25J 11/00* (2006.01)
(52) U.S. Cl.
CPC ......... *B25J 11/0005* (2013.01); *B25J 9/1669* (2013.01)
(58) Field of Classification Search
CPC ...... B25J 11/0005; B25J 13/08; B25J 9/1669; B25J 9/1661; B25J 9/16; B25J 9/163
See application file for complete search history.

(56) References Cited

U.S. PATENT DOCUMENTS 7,984,013 B2 7/2011 Lee et al.
9,639,084 B2 * 5/2017 Nakamura ........... G05D 1/0246
(Continued)

FOREIGN PATENT DOCUMENTS

EP 3831548 A1 6/2021
JP 2006-247780 A 9/2006
(Continued)

OTHER PUBLICATIONS

International Search Report dated Dec. 22, 2022, issued in International Patent Application No. PCT /KR2022/013080.
(Continued)

*Primary Examiner* — Dalena Tran
(74) *Attorney, Agent, or Firm* — Jefferson IP Law, LLP

(57) ABSTRACT
A robot is provided. The robot includes at least one sensor, a driver, memory storing one or more computer programs, and one or more processors operatively coupled with the at least one sensor, the driver, and the memory, wherein the one or more computer programs include computer-executable instructions that, when executed by the one or more processors, cause the robot to detect the occurrence of an event through the at least one sensor, identify an interaction corresponding to the event, identify user context, identify an interaction parameter based on history information stored in the memory, the interaction, and the user context, control the driver to perform the interaction based on the identified interaction parameter, obtain information on a user's response according to the performed interaction, and update the history information based on information on the identified interaction parameter and the response.

20 Claims, 8 Drawing Sheets

| | INTERACTION | USER CONTEXT | USER RESPONSE SCORE | INTERACTION PARAMETER 1 (APPROACHING SPEED) | INTERACTION PARAMETER 2 (INTERVAL WITH USER) | INTERACTION PARAMETER 3 (UTTERANCE VOLUME) |
|---|---|---|---|---|---|---|
| 610 | APPROACH USER | USER:USER 1 LOCATION:LIVING ROOM | 0.7 | 0.7m/s | 0.7m | |
| 620 | APPROACH USER | USER:USER 1 LOCATION:LIVING ROOM | 0.8 | 0.5m/s | 0.8m | |
| 630 | APPROACH USER | USER:USER 2 LOCATION:BED ROOM | 0.5 | 0.5m/s | 0.6m | |
| 640 | APPROACH USER | USER:USER 2 LOCATION:BED ROOM | 0.6 | 0.6m/s | 0.5m | |
| 650 | APPROACH USER | USER:USER 2 LOCATION:BED ROOM | 0.7 | 0.7m/s | 0.4m | |
| | PROVIDE NOTIFICATION TO USER | USER:USER 1 LOCATION:KITCHEN | 0.6 | 0.5m/s | 0.6m | 5 |

(56)     References Cited

U.S. PATENT DOCUMENTS

| | | |
|---|---|---|
| 11,514,259 B2 | 11/2022 | Yang et al. |
| 11,548,147 B2 | 1/2023 | Jia |
| 2016/0103202 A1* | 4/2016 | Sumiyoshi ................ G01S 5/18 |
| | | 367/118 |
| 2018/0074508 A1* | 3/2018 | Kleiner ................ G05D 1/6482 |
| 2019/0248019 A1* | 8/2019 | Nelson ................. G10L 15/222 |
| 2021/0170585 A1 | 6/2021 | Kim et al. |
| 2022/0026920 A1* | 1/2022 | Ebrahimi Afrouzi ........................ |
| | | G06N 3/0495 |
| 2022/0288788 A1 | 9/2022 | Kim et al. |
| 2023/0000304 A1 | 1/2023 | Moon et al. |

FOREIGN PATENT DOCUMENTS

| | | |
|---|---|---|
| JP | 2011-000681 A | 1/2011 |
| KR | 10-1295003 B1 | 8/2013 |
| KR | 10-1842963 B1 | 3/2018 |
| KR | 10-2019-0079255 A | 7/2019 |
| KR | 10-2019-0098781 A | 8/2019 |
| KR | 10-2019-0100094 A | 8/2019 |
| KR | 10-2020-0018184 A | 2/2020 |
| KR | 10-2140292 B1 | 7/2020 |
| KR | 10-2222911 B1 | 3/2021 |
| KR | 10-2021-0096811 A | 8/2021 |

OTHER PUBLICATIONS

Korean Office Action dated Feb. 4, 2026, issued in Korean Application No. 10-2021-0140975.

* cited by examiner

FIG. 6

| INTERACTION | USER CONTEXT | USER RESPONSE SCORE | INTERACTION PARAMETER 1 (APPROACHING SPEED) | INTERACTION PARAMETER 2 (INTERVAL WITH USER) | INTERACTION PARAMETER 3 (UTTERANCE VOLUME) |
|---|---|---|---|---|---|
| APPROACH USER | USER:USER 1 LOCATION:LIVING ROOM | 0.7 | 0.7m/s | 0.7m | |
| APPROACH USER | USER:USER 1 LOCATION:LIVING ROOM | 0.8 | 0.5m/s | 0.8m | |
| APPROACH USER | USER:USER 2 LOCATION:BED ROOM | 0.5 | 0.5m/s | 0.6m | |
| APPROACH USER | USER:USER 2 LOCATION:BED ROOM | 0.6 | 0.6m/s | 0.5m | |
| APPROACH USER | USER:USER 2 LOCATION:BED ROOM | 0.7 | 0.7m/s | 0.4m | |
| PROVIDE NOTIFICATION TO USER | USER:USER 1 LOCATION:KITCHEN | 0.6 | 0.5m/s | 0.6m | 5 |

610  620  630  640  650

ROBOT AND CONTROLLING METHOD THEREOF

CROSS-REFERENCE TO RELATED APPLICATION(S)

This application is a continuation application, claiming priority under § 365(c), of an International application No. PCT/KR2022/013080, filed on Sep. 1, 2022, which is based on and claims the benefit of a Korean patent application number 10-2021-0140975, filed on Oct. 21, 2021, in the Korean Intellectual Property Office, the disclosure of which is incorporated by reference herein in its entirety.

BACKGROUND

1. Field

The disclosure relates to a robot and a controlling method thereof. More particularly, the disclosure relates to a robot for providing an interaction corresponding to a corresponding event when the occurrence of an event is detected, and a controlling method thereof.

2. Description of Related Art

A related-art robot performs an interaction corresponding to an event when the occurrence of an event is detected. In this case, the related-art robot performs an interaction based on a preset interaction parameter.

When preferred interaction parameters are different according to different user contexts, an interaction suitable for a user or a situation may not be performed as an interaction is performed based on a preset interaction parameter.

In order to identify an interaction parameter based on a user context by using machine learning, such as reinforcement learning, there may be a problem that a plurality of interaction performance histories are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot for identifying an interaction parameter based on history information stored in a robot, and identifying an interaction parameter by combining an interaction parameter value included in history information stored in the robot when there is no sufficient interaction performance history, and a controlling method thereof.

Additional aspects will be set forth in part in the description which follows and, in part, will be apparent from the description, or may be learned by practice of the presented embodiments.

In accordance with an aspect of the disclosure, a method of controlling a robot is provided. The method includes identifying an interaction corresponding to the event, identifying a user context, identifying an interaction parameter based on history information stored in the robot, the interaction, and the user context, performing the interaction based on the identified interaction parameter, obtaining information on a user's response according to the performed interaction, and updating the history information based on the information on the identified interaction parameter and the user's response.

The identifying of the interaction parameter includes, based on a number of at least one first history corresponding to the interaction and the user context among the history information being greater than or equal to a first threshold value, identifying the interaction parameter by performing regression on the at least one interaction parameter included in the at least one first history and a response score of the user.

The identifying of the interaction parameter includes, based on a number of at least one first history corresponding to the interaction and the user context among the history information being less than a first threshold value, identifying the interaction parameter by using at least one interaction parameter included in a second history among the history information.

The identifying of the interaction parameter includes, based on a score of a response of the user included in at least one first history corresponding to the interaction and the user context among the history information being greater than or equal to a second threshold value, identifying the interaction parameter by performing regression on at least one interaction parameter included in the first history and the response score of the user.

The identifying of the interaction parameter includes, based on a score of a response of the user included in at least one first history corresponding to the interaction and the user context among the history information being less than a second threshold value, identifying the interaction parameter by using at least one interaction parameter included in a second history among the history information.

The method further includes updating history information by removing a duplicate history or incorporating similar histories among a plurality of histories included in the history information.

The identifying of the user context includes identifying the user context based on information comprising at least one of the identification information of the user, location information of the user, pose information of the user, weather information, or stock price information.

The obtaining of the information on the user's response includes, based on user information to obtain information on the user's response being set, obtaining the user's response based on the set user's information, and converting the obtained user's response to the response score of the user.

In accordance with another aspect of the disclosure, a robot is provided. The robot includes at least one sensor, a driver, memory storing one or more computer programs, and one or more processors operatively coupled with the at least one sensor, the driver, and the memory, wherein the one or more computer programs include computer-executable instructions that, when executed by the one or more processors, cause the robot to detect occurrence of an event through the at least one sensor, identify an interaction corresponding to the event, identify a user context, identify an interaction parameter based on history information stored in the memory, the interaction, and the user context, control the driver to perform the interaction based on the identified interaction parameter, obtain information on a user's response according to the performed interaction, and update the history information based on information on the identified interaction parameter and the user's response.

The one or more computer programs further include computer-executable instructions that, when executed by the one or more processors, cause the robot to, based on a number of at least one first history corresponding to the interaction and the user context among the history information being greater than or equal to a first threshold value, identify the interaction parameter by performing regression on the at least one interaction parameter included in the at least one first history and a response score of the user.

The one or more computer programs further include computer-executable instructions that, when executed by the one or more processors, cause the robot to, based on a number of at least one first history corresponding to the interaction and the user context among the history information being less than a first threshold value, identify the interaction parameter by using at least one interaction parameter included in a second history among the history information.

The one or more computer programs further include computer-executable instructions that, when executed by the one or more processors, cause the robot to, based on a score of a response of the user included in at least one first history corresponding to the interaction and the user context among the history information being greater than or equal to a second threshold value, identify the interaction parameter by performing regression on at least one interaction parameter included in the first history and the response score of the user.

The one or more computer programs further include computer-executable instructions that, when executed by the one or more processors, cause the robot to, based on a score of a response of the user included in at least one first history corresponding to the interaction and the user context among the history information being less than a second threshold value, identify the interaction parameter by using at least one interaction parameter included in a second history among the history information.

The one or more computer programs further include computer-executable instructions that, when executed by the one or more processors, cause the robot to update history information by removing a duplicate history or incorporating similar histories among a plurality of histories included in the history information.

The one or more computer programs further include computer-executable instructions that, when executed by the one or more processors, cause the robot to identify the user context based on information comprising at least one of the identification information of the user, location information of the user, pose information of the user, weather information, or stock price information.

The one or more computer programs further include computer-executable instructions that, when executed by the one or more processors, cause the robot to, based on user information to obtain information on the user's response being set, obtain the user's response based on the set user's information, and convert the obtained user's response to the response score of the user.

In accordance with another aspect of the disclosure, one or more non-transitory computer-readable storage media storing computer-executable instructions that, when executed by one or more processors of a robot, cause the robot to perform operations are provided. The operations include identifying an interaction corresponding to the event, identifying a user context, identifying an interaction parameter based on history information stored in the robot, the interaction, and the user context, performing the interaction based on the identified interaction parameter, obtaining information on a user's response according to the performed interaction, and updating the history information based on the information on the identified interaction parameter and the user's response.

The disclosure has an effect of performing an interaction suitable for a user or a circumstance by identifying an interaction parameter based on a user context by a robot through the embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating history information stored in a robot according to an embodiment of the disclosure.

Throughout the drawings, it should be noted that like reference numbers are used to depict the same or similar elements, features, and structures.

DETAILED DESCRIPTION

Figure 1A:
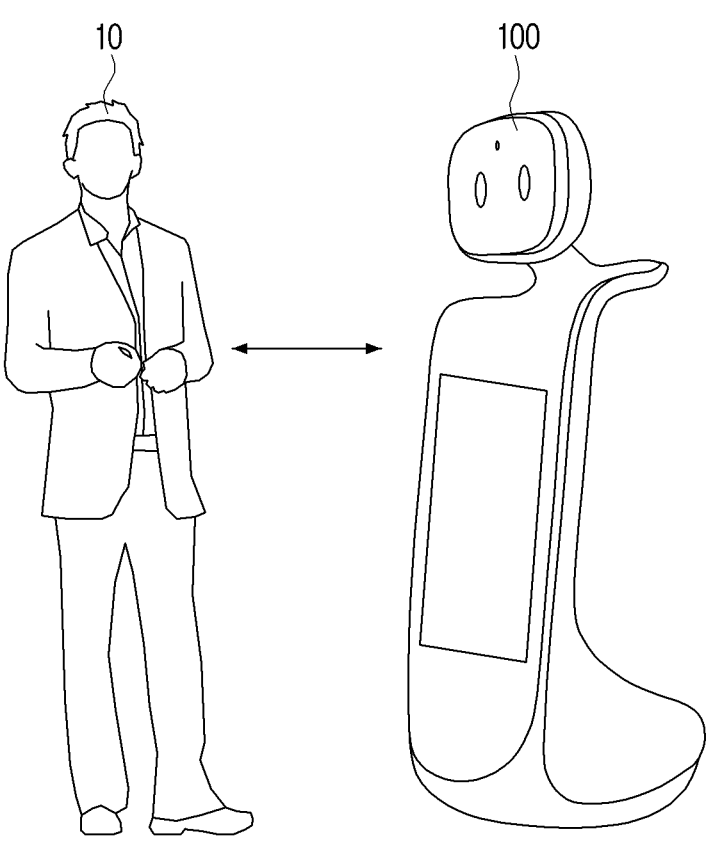
FIGS. 1A and 1B are diagrams schematically illustrating an operation of a robot according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure, a detailed description of known functions or configurations incorporated herein will be omitted when it may make the gist of the disclosure rather unclear.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

In this specification, the expressions "have," "may have," "include," or "may include" or the like represent presence of a corresponding feature (for example: components, such as numbers, functions, operations, or parts) and does not exclude the presence of additional feature.

In this document, expressions, such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, the terms "first," "second," or the like may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

In addition, the expression "configured to" used in the disclosure may be interchangeably used with other expressions, such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processor (CPU) or an application processor) that can perform the corresponding operations by executing one or more software programs stored in memory device.

Terms, such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

It is understood that various elements and regions in the figures are shown out of scale. Accordingly, the scope of the disclosure is not limited by the relative sizes or spacing drawn from the accompanying drawings.

Hereinafter, an embodiment according to the disclosure will be described with reference to the accompanying drawings so as to be easily carried out by a person skilled in the art to which the disclosure belongs.

It should be appreciated that the blocks in each flowchart and combinations of the flowcharts may be performed by one or more computer programs which include computer-executable instructions. The entirety of the one or more computer programs may be stored in a single memory devise or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1B:
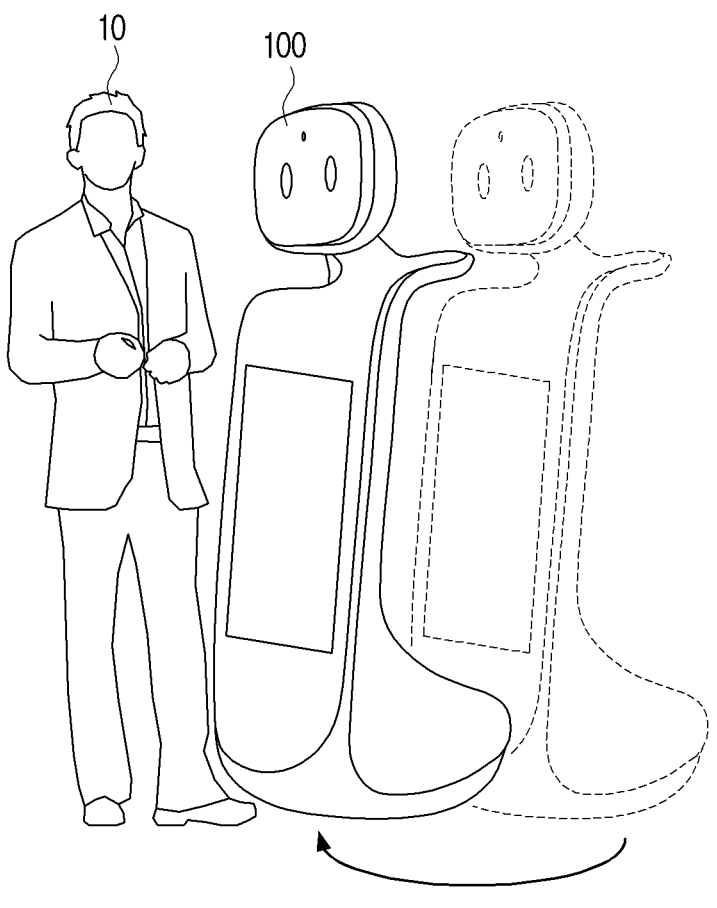

FIGS. 1A and 1B are diagrams schematically illustrating an operation of a robot according to various embodiments of the disclosure.

Referring to FIG. 1A, a robot 100 may detect the occurrence of an event. Alternatively, the robot 100 may obtain a control command for controlling the robot 100. The robot 100 may detect the occurrence of an event based on at least one sensor. Here, the event may be a command input of the user 10 for controlling the robot 100, an utterance or gesture of the user 10, and a series of events occurring around the robot 100. Alternatively, the robot 100 may obtain information on the occurrence of an event through the communication interface 120 or a user interface 130, and detect the occurrence of the event.

When an event occurs, the robot 100 may identify an interaction corresponding to an event (or a control command). Here, the interaction (or service) may mean the function of the robot 100 provided by the robot 100 to the user 10.

For example, the robot 100 may detect occurrence of a voice input event of the user 10 by detecting a voice, such as "come here" from the user 10. The robot 100 may identify an interaction "approach a user" corresponding to the detected voice input of the user 10.

The robot 100 may identify a context of the user 100. The context of the user 10 may denote identification information of the user 10, location information of the user 10, pose information of the user 10, or weather information, but this is merely an embodiment of the disclosure, and may refer to various information related to the user 10. In this case, although it has been described that the robot 100 detects the occurrence of an event and identifies the context of the user 10 after identifying the interaction, this is merely an embodiment of the disclosure, and the robot 100 may identify the context of the user 10 or identify the context of the user 10 along with the operation of detecting the event occurrence or identifying the interaction, or before the operation of detecting the event occurrence or identifying the interaction.

The robot 100 may identify an interaction parameter based on the history information stored in the robot 100, the identified interaction, and the identified context of the user 10. For example, if the identified interaction is "approach the user" and the identified user 10 context is "user: user 1, user location: living room," the robot 100 may identify an interaction parameter for performing the identified interaction based on a stored interaction performance history information matched to the identified interaction and the identified user context. In this case, when the number or condition of the first history matched with the identified interaction and the identified context of the user 10 does not satisfy a predetermined condition, the interaction parameter may be identified based on the second history.

Referring to FIG. 1B, based on the identified interaction parameter, the robot 100 may perform the identified interaction. When the identified interaction parameter 1 (approaching speed) is 0.7 m/s and interaction parameter 2 (interval with a user) is 0.7 m, the robot 100 may move to a point where the distance to the user 10 is 0.7 m at a speed of 0.7 m/s.

The robot 100 may obtain information on the response of the user 10 according to the performed interaction. The information on the response of the user may be information indicating a degree to which the user satisfies for an interaction performed by the user. Specifically, the robot 100 may obtain a response, such as a user's facial expression, pose, and behavior, and convert the obtained user's response into a score.

The robot 100 may update history information stored in the robot 100 based on the identified interaction parameter and information on the response. Hereinafter, the configuration and operation of the robot according to the disclosure will be described through the drawings.

Figure 2:
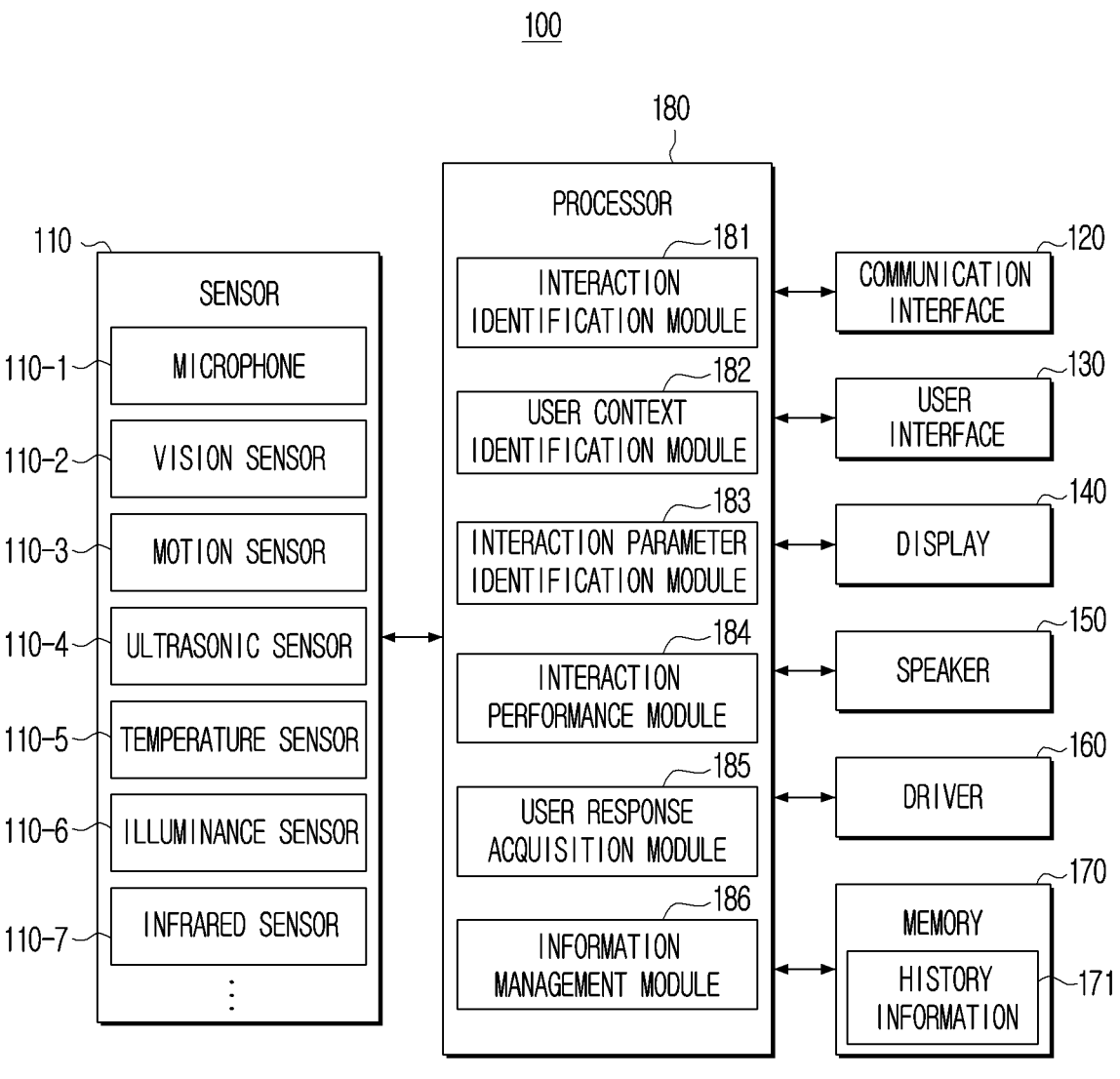
FIG. 2 is a block diagram illustrating a configuration of a robot according to an embodiment of the disclosure.

FIG. 2 is a block diagram illustrating a configuration of a robot according to an embodiment of the disclosure.

Referring to FIG. 2, the robot 100 may include a sensor 110, a communication interface 120, the user interface 130, a display 140, a speaker 150, a driver 160, memory 170, and a processor 180. A part of the elements of the robot 100 may be omitted and some other elements may be further included.

The sensor 110 may be an element for obtaining various information on the surroundings of the robot 100. The sensor 110 may detect physical changes, such as heat, light, temperature, pressure, sound, and the like, and change the detected physical changes to electrical signals, and may obtain various information on the surroundings of the robot 100 based on the changed electrical signals. The sensor 110 may include a microphone 110-1, a vision sensor 110-2, a motion sensor 110-3, an ultrasonic sensor 110-4, a temperature sensor 110-5, an illuminance sensor 110-6, or an infrared sensor 110-7. For example, the robot 100 may detect the presence of a user existing at a close location based on information detected through a LiDAR sensor or an ultrasonic sensor. However, this is merely an embodiment of the disclosure, and the robot 100 may include a user's command, such as an acceleration sensor (not shown), a gyro sensor (not shown), or the like, a context of the user, or various information around the robot 100.

The sensor 110 may be activated only when a specific condition is satisfied to prevent unnecessary power consumption. For example, the sensor 110 may be activated only when a user is detected around the robot 100. Alternatively, when the robot 100 is a part of the IoT system, the sensor 110 may be activated when a front door is opened or a condition in which the indoor lighting is turned on is satisfied. However, the embodiment is not limited to the above-described embodiment of the disclosure, and the sensor 110 may be activated all the time.

The microphone 110-1 may obtain a sound around the robot 100 or a user voice. The microphone 110-1 may receive an external sound signal to generate electrical voice information, and the robot 100 may include a plurality of microphones 110-1. The robot 100 may estimate a direction of a sound source generating a sound signal using a difference in arrival times of sound signals input to each of the plurality of microphones. The microphone 110-1 may use various noise removal algorithms to remove noise generated in a process of receiving an external sound signal.

The vision sensor 110-2 may be a sensor for detecting a user or an object around the robot 100. For example, the vision sensor 110-2 may include at least one of a camera, a radar sensor, a LiDAR sensor, an ultrasonic sensor, an RF sensor, or a depth sensor. When the vision sensor 110-2 is a type of transmissive radar, a user or an object located behind the obstacle may be recognized.

The motion sensor 110-3 may be a sensor for detecting a movement. The motion sensor 110-3 may be a sensor used for detecting a movement of a user or a movement of an object.

The ultrasonic sensor 110-4 may be a sensor for measuring a distance or detecting an object by using an inaudible frequency. For example, the ultrasonic sensor 110-4 may be a type of an active sensor and may measure a distance by measuring time of flight (ToF) by transmitting a specific signal. Here, the ToF is a method of measuring a flight time distance and may be a method for measuring a distance by measuring a time difference between a reference time point at which a pulse is launched and a detection time point of a pulse reflected and returned from the object to be measured.

The temperature sensor 110-5 may be a sensor which detects heat and generates an electrical signal. The temperature sensor 110-5 may detect a temperature by using a property of changing electrical characteristics according to a temperature.

The illuminance sensor 110-6 may be a sensor for measuring the brightness of light. The illuminance sensor 110-6 may refer to a sensor for measuring the brightness of light by using a light variable resistance whose resistance changes according to the brightness of light.

The infrared sensor 110-7 may refer to a device for sensing physical quantities or chemical quantities, such as temperature, pressure, and intensity of radiation, by using infrared rays, and converting the amount of electricity. The infrared sensor 110-7 may be used to detect a user or object in case of low illumination (e.g., night).

The communication interface 120 includes circuitry and is configured to communicate with an external device and a server. The communication interface 120 may communicate with an external device or a server based on a wired or wireless communication method. In this example, the communication interface 120 may include a Wi-Fi module, a Bluetooth module, an infrared (IR) module, local area network (LAN) module, Ethernet module, or the like. Here, each communication module may be implemented with at least one hardware chip format. The wireless communication module may include at least one communication chip performing communication according to various communication standards, such as Zigbee, universal serial bus (USB), mobile industry processor interface camera serial interface (MIPI CSI), third generation (3G), $3^{rd}$ generation partnership project (3GPP), long term evolution (LTE), LTE advanced (LTE-A), $4^{th}$ generation (4G), $5^{th}$ generation (5G), or the like, in addition to the communication modes described above. These are merely examples, and the communication interface 120 may use at least one communication module among various communication modules. The communication interface 120 communicates with external devices to transmit and receive various data for detecting an event or identifying a user context. When the user context identification is performed in the external server, the communication interface 120 may transmit the obtained user data to an external server, and receive an analysis result of the user data or the identified user context information from the external server.

The user interface 130 is configured to receive a user command to control the robot 100. The user interface 130 may be implemented as a device, such as at least one of a button, a touch pad, a mouse, a keyboard, or a touch screen capable of performing the above-described display function and operation input function. Here, the button may be various types of buttons, such as at least one of a mechanical button, a touch pad, a wheel, or the like, formed in an arbitrary region, such as at least one of a front portion, a side portion, a back portion, or the like, of the outer surface of the main body of the robot 100. The robot 100 may obtain various user inputs through the user interface 130.

The display 140 may be implemented as a display including a self-emitting element or a display including a non-self-limiting element and a backlight. For example, the display 140 may be implemented as a display of various types, such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 140, a backlight unit, a driving circuit which may be implemented as an a-si TFT, low temperature poly silicon (LTPS) TFT, organic TFT (OTFT), or the like, may be included as well.

The display 140 may output state information of the robot 100. The state information may include various information related to driving of the robot 100, such as a driving mode of the robot 100, battery-related information, and whether to return to a docking station (not shown).

In addition, the display 140 may provide a response or interaction corresponding to the generated event through the display 140. For example, when a user detects a voice input, such as "please let me know about whether" from a user, the robot 100 may control the display 140 to perform an interaction of displaying weather information.

The speaker 150 may be configured to output various notification sounds or voice messages as well as various audio data on which various processing operations, such as decoding, amplification, and noise filtering are performed by the audio processor. In particular, the speaker 150 may be used to provide a service for a detected event. For example, the robot 100 may output a natural language-type voice message by using the speaker 150 in order to perform an interaction that provides information to the user. Meanwhile, the configuration for outputting audio may be implemented with the speaker 150, but this is merely an embodiment of the disclosure, and may be implemented as an output terminal capable of outputting audio data.

The driver 160 may be an element for controlling motion or movement of the robot 100. The driver 160 may control the moving means of the robot 100, and may be electrically connected to a mechanical configuration that implements a physical movement of the robot 100 to drive/control the corresponding configuration. For example, when implemented in the form of the robot 100 of FIGS. 1A and 1B, the driver 160 may control a wheel of the robot 100 and a mechanical configuration for controlling the rotation of the head of the robot 100. In addition, if a separate configuration, such as arm or leg is included in the robot, the driver 160 may be implemented to control movement of the arms and legs.

The memory 170 may store at least one instruction related to the robot 100. The memory 170 may store an operating system (OS) for driving the robot 100. The memory 170 may store a threshold value for identifying whether the robot 100 has completed drying. In addition, the memory 170 may store various software programs or applications for operating the robot 100 according to various embodiments of the disclosure. The memory 170 may include semiconductor memory, such as flash memory or a magnetic storage medium, such as a hard disk.

Specifically, the memory 170 may store various software modules for operating the robot 100 according to various embodiments of the disclosure, and the processor 180 may control the operation of the robot 100 by executing various software modules stored in the memory 170. For example, the memory 170 is accessed by the processor 180 and reading/writing/modifying/deleting/updating of data by the processor 180 may be performed.

In the disclosure, the term memory 170 may include the memory, read-only memory (ROM) in the processor 180, random access memory (RAM), or memory card (for example, a micro secure digital (SD) card, and memory stick) mounted to the robot 100.

In particular, the memory 170 may store history information 171 for the interaction performance history of the robot 100. Here, the history information 171 may be information in which information on an interaction, a user context, information on a user response, and an interaction parameter are matched and stored. The history information 171 may include at least one history. The history information stored in the memory 170 will be described with reference to FIG. 5.

The processor 180 may control overall operation and function of the robot 100. To be specific, the processor 180 may be connected to the configuration of the robot 100 including the memory 170 and control overall operation of the robot 100 by executing at least one instruction stored in the memory 170.

The processor 180 may be implemented in various ways. For example, the processor 180 may be implemented with at least one of an application specific integrated circuit (ASIC), an embedded processor, a microprocessor, a hardware control logic, a hardware finite state machine (FSM), and a digital signal processor (DSP). In the meantime, the term processor 180 in the disclosure may be used as a term including a central processor (CPU), a graphic processor (GPU), a main processor (MPU), or the like.

The processor 180 may include an interaction identification module 181, a user context identification module 182, an interaction parameter identification module 183, an interaction performance module 184, a user response acquisition module 185, and a history information management module 186. A plurality of modules according to the disclosure may be implemented as software modules or hardware modules, and when a plurality of modules are implemented as software modules, the processor 180 may access the software modules by loading the software modules stored in the memory 170. A detailed method of controlling the operation and function of the robot 100 by the processor 180 will be described with reference to FIG. 3.

Figure 3:
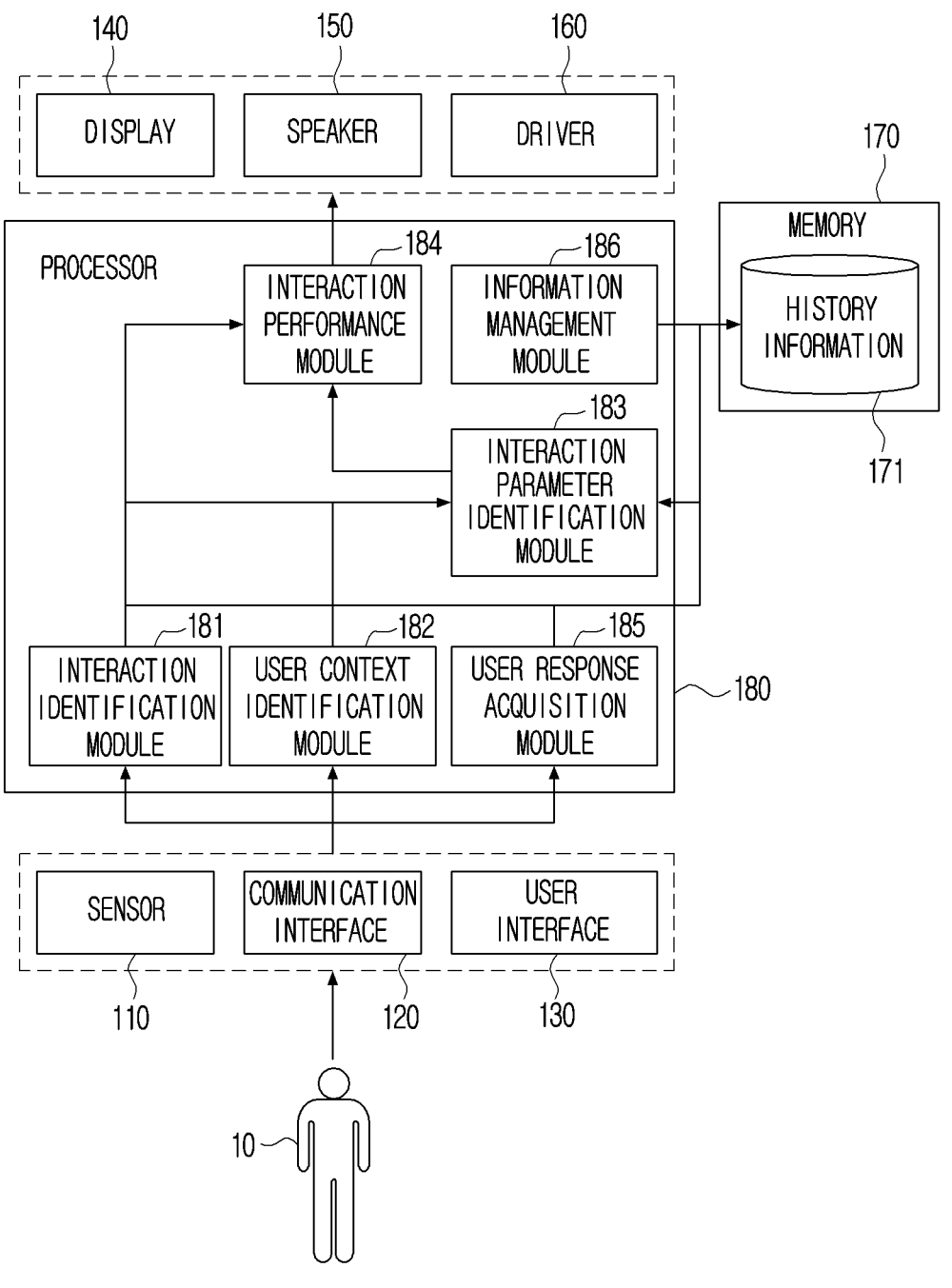
FIG. 3 is a diagram illustrating an operation of a robot according to an embodiment of the disclosure.

FIG. 3 is a diagram illustrating an operation of a robot according to an embodiment of the disclosure.

Referring to FIG. 3, the processor 180 may detect occurrence of an event based on a sensing value obtained by at least one sensor 110. For example, the robot 100 may detect occurrence of an event based on information obtained by a vision sensor 110-2, such as a microphone 110-1 or a camera. Alternatively, the processor 180 may detect occurrence of an event through various information, such as sound, illumination, vibration, or the like, detected above a preset value.

In this example, the processor 180 may detect occurrence of an event by using not only a sensor included in the robot 100 but also an external sensor included in an external device (not shown). When the occurrence of an event is detected from an external device, the processor 180 may obtain information on the occurrence of an event through the communication interface 120. Alternatively, the processor 180 may obtain information on an event from a user through the user interface 130.

When the occurrence of an event is detected, the interaction identification module 181 may identify an interaction corresponding to the event. For example, when the processor 180 detects the occurrence of a voice input event called "come here" from the user, the interaction identification module 181 may identify an interaction, such as "approach the user" corresponding to a voice input event called "come here".

The user context identification module 182 may identify a user context from information obtained via the sensor 110, the communication interface 120, or the user interface 130. For example, the user context identification module 182 may identify the user's identity or user's location from the image obtained via the vision sensor 110-2. Alternatively, the user context identification module 182 may obtain location information of the user from a portable terminal device (not shown) of the user through the communication interface 120 to identify the location of the user.

For example, the user context identification module 182 may identify a user subject to performing interactions among a plurality of users.

The interaction parameter identification module 183 may identify at least one interaction parameter based on the history information 171 stored in the memory 170, the identified interaction, and the identified user context. A specific method for identifying an interaction parameter by the interaction parameter identification module 183 is described with reference to FIGS. 4 to 5.

The type of interaction parameter identified by the interaction parameter identification module 183 may vary according to the identified interaction. For example, if interaction 1 is identified, the interaction parameter identification module 183 may identify interaction parameters 1, 2, and if interaction 2 is identified, the interaction parameter identification module 183 may identify interaction parameters 2, 3. In this case, the type of the interaction parameter identified according to the interaction may be set by the user.

Based on the at least one identified interaction parameter, the interaction performance module 184 may perform an interaction. For example, the identified interaction may be "approach the user" and the identified interaction parameter 1 (approaching speed) may be 0.7 m/s, the interaction parameter 2 (the interval with the user) may be 0.7 m. The interaction performance module 184 may control the driving

160 to move to a point where the distance to the user becomes 0.7 m at a speed of 0.7 m/s.

When the robot 100 performs an interaction, the user response acquisition module 193 may obtain information on a response of the user according to the performed interaction. Specifically, the user response acquisition module 193 may obtain information on a response of a user through the sensor 110, the communication interface 120, or the user interface 130.

The information on the response of the user may be obtained through user input information. For example, the user response acquisition module 185 may provide the user with a UI for obtaining a user response through the display 140. At this time, the user response acquisition module 193 may obtain information on a user response based on a user input inputted through the UI.

The user information for obtaining information on the response of the user may be set differently. For example, the user information for obtaining the user's response may be a facial expression (positive or negative) of the user, whether the user approaches the robot 100, or a uttered voice of the user (for example, "please say that again"). This is merely an embodiment of the disclosure, and the user response acquisition module 193 may obtain various user information and obtain information on a user response based on the obtained user information.

When user information is set, the user response acquisition module 193 may obtain a response of a user based on the set user information. At this time, the user response acquisition module 193 may convert the obtained response of at least one user into a response score of a user.

For example, the user response acquisition module 193 may obtain the facial expression of a user through the vision sensor 110-1. The user response acquisition module 193 may extract feature point coordinates of a face, analyze the facial expression, and obtain a response score of the user based on pre-stored emotion distribution data or an emotion table. Alternatively, the user response acquisition module 193 may obtain the user's voice through the microphone 110-2. The user response acquisition module 193 may extract a voice feature vector of a user and compare the extracted voice feature vector with pre-stored emotion distribution data or an emotion table to obtain a response score of the user.

The response score of the user may be a value between 0 and 1. As the response of the user has a high satisfaction with respect to the performance of the interaction (as the response of the user is positive), the response score of the user may be a high value. For example, if the user information is set to the information whether the user approaches the robot 100 or not, the user response acquisition module 185 may identify whether the user approaches the robot 100 and the degree of approaching (for example, 0.5 m). In this case, the larger the extent of the user approaching the robot 100, the higher the response score. The response score of the user when the user approaches the robot 100 by 0.7 m may be a value higher than the response score of the user when the user approaches the robot 100 by 0.5 m.

According to another example, when user information is set as a facial expression of a user, a user response score may be obtained based on a predefined emotion table. When a smiling expression, a surprise expression, or the like is obtained, a relatively high user response score may be obtained compared to a case in which a frowning expression or a sad expression is obtained.

According to another embodiment of the disclosure, when a voice signal, such as a smiling sound or exclamation of a user is obtained, a relatively high user response score may be obtained compared to a case where a voice signal for a crying sound or a frustrated sound is obtained.

The history information management module 186 may update the history information 171 based on the identified interaction parameters and information on the response. The history information management module 186 may store a history (or data) obtained by matching the identified interaction, the identified user context, the identified interaction parameter, and the information on the user response in the history information 171.

The history information management module 186 may update history information by removing a duplicate history or incorporating similar histories among a plurality of histories included in the history information 171.

Figure 4:
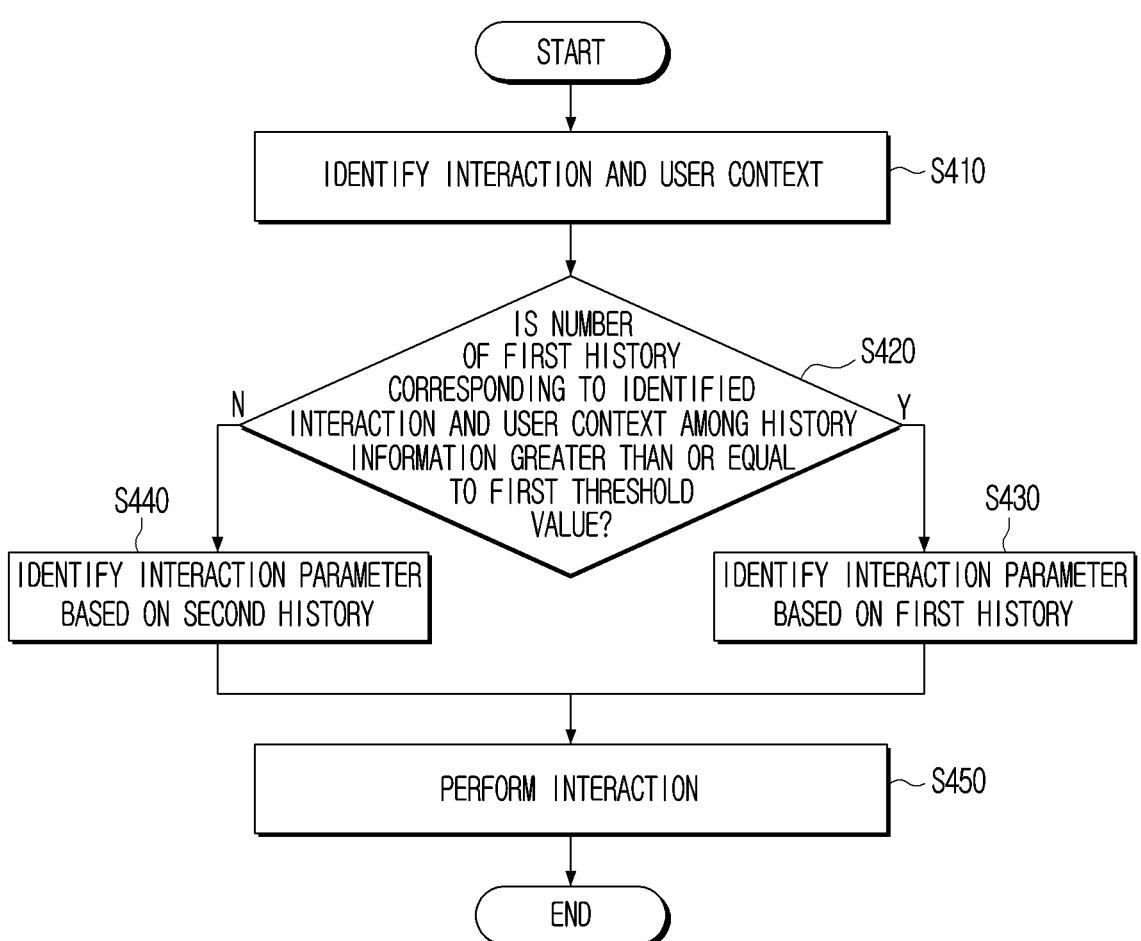
FIG. 4 is a diagram illustrating a method for a robot to identify an interaction parameter according to an embodiment of the disclosure.
Figure 5:
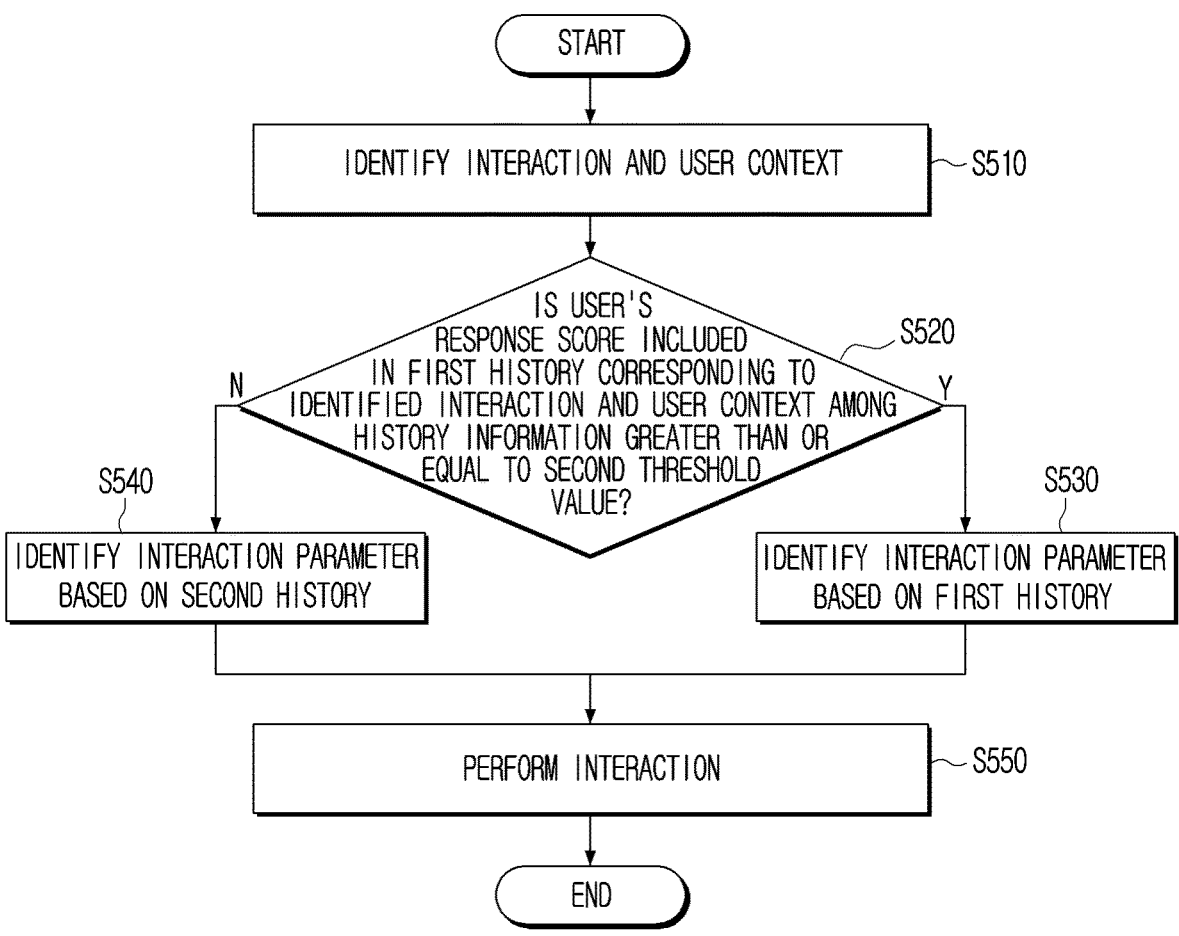
FIG. 5 is a diagram illustrating a method for a robot to identify an interaction parameter according to an embodiment of the disclosure.

FIGS. 4 and 5 are diagrams illustrating a method of identifying an interaction parameter by a robot according to various embodiments of the disclosure.

Referring to FIG. 4, the processor 180 may, when an event occurrence is detected, identify the interaction and the user context in operation S410.

The processor 180 may identify whether the number of first history corresponding to the identified interaction and the user context among the history information 171 stored in the memory 170 is greater than or equal to a first threshold value in operation S420.

FIG. 6 is a diagram illustrating history information stored in a robot according to an embodiment of the disclosure.

When the number of first history is greater than or equal to a first threshold value in operation 420-Y, the processor 180 may identify an interaction parameter based on at least one first history in operation S430. When it is determined that the number of first history is not greater than or equal to a first threshold value in operation 420-Y, the processor 180 may identify an interaction parameter based on at least one second history in operation S440.

Referring to FIG. 6, the memory 170 may store history information 171 as illustrated in FIG. 6. Here, the history information may be information in which an interaction, a user context, a user response score, and an interaction parameter are matched and stored. For example, if the identified interaction is "approach a user" and the identified user context is "user: user 1, location: living room," the number of first history 610, 620 may be 2. When the first threshold value is 2, the processor 180 may perform regression analysis on the interaction parameter and the user response score included in the first history 610, 620 to identify the interaction parameter so that the user response score has a high value. However, this is merely an embodiment of the disclosure, and an interaction parameter may be identified by using various methods, such as a method for identifying, as an interaction parameter of an identified interaction, an interaction parameter value matched and stored in a history 620 having a highest user response among pre-stored histories or a method for combining or modifying an interaction parameter value stored in a previously stored history.

If the number of first history is less than a first threshold value in operation S420-N, the processor 180 may identify an interaction parameter based on at least one second history in operation S430. Referring to FIG. 6, when a first threshold value is 3, the number of first histories 610, 620 may be less than a first threshold value. At this time, the processor 180 may identify an interaction parameter based on at least one second history 630, 640, 650 different from the first history 610, 620. In this case, the second history 620, 630, 640 may be a history equal to or greater than the first threshold value, but is not limited thereto. The processor 180 may perform regression on the parameter included in the second history 620, 630, 640 and the user response score, or may combine or modify the parameter included in the second history to identify the interaction parameter. According to an embodiment of the disclosure, the processor 180 may randomly generate a parameter value without using a second history to identify an interaction parameter or apply transformation to a parameter included in the first history to identify an interaction parameter.

The processor 180 may perform an interaction based on the identified interaction parameter in operation S450.

Referring to FIG. 5, the processor 180 may, when an event occurrence is detected, identify the interaction and the user context in operation S510.

The processor 180 may identify whether the user response score included in the first history corresponding to the user context and the identified interaction among the history information 171 stored in the memory 170 is greater than or equal to a second threshold value in operation S520. For example, if the identified interaction is "approach a user" and the identified user context is "user: user 1, location: living room," the user response score included in the first history 610, 620 may be 0.7 and 0.8. When the second threshold value is 0.8, the processor 180 may identify that the user response score included in the first history 610, 620 is greater than or equal to a second threshold value.

When the response score of the user included in the first history is greater than or equal to the second threshold value in operation S520-Y, the processor 180 may identify the interaction parameter based on the first history information in operation S530.

If the response score of the user included in the first history is less than a second threshold value in operation S520-N, the processor 180 may identify an interaction parameter based on a second history different from the first history in operation S540. Alternatively, the processor 180 may apply a partial change to an interaction parameter included in the first history or randomly generate an interaction parameter.

Based on the identified interaction parameter, the processor 180 may perform an interaction in operation S550.

Through the above-described method, the robot 100 may find an interaction parameter suitable for the user context even when the number or condition of the history included in the history information 171 does not satisfy a predetermined condition.

Figure 7:
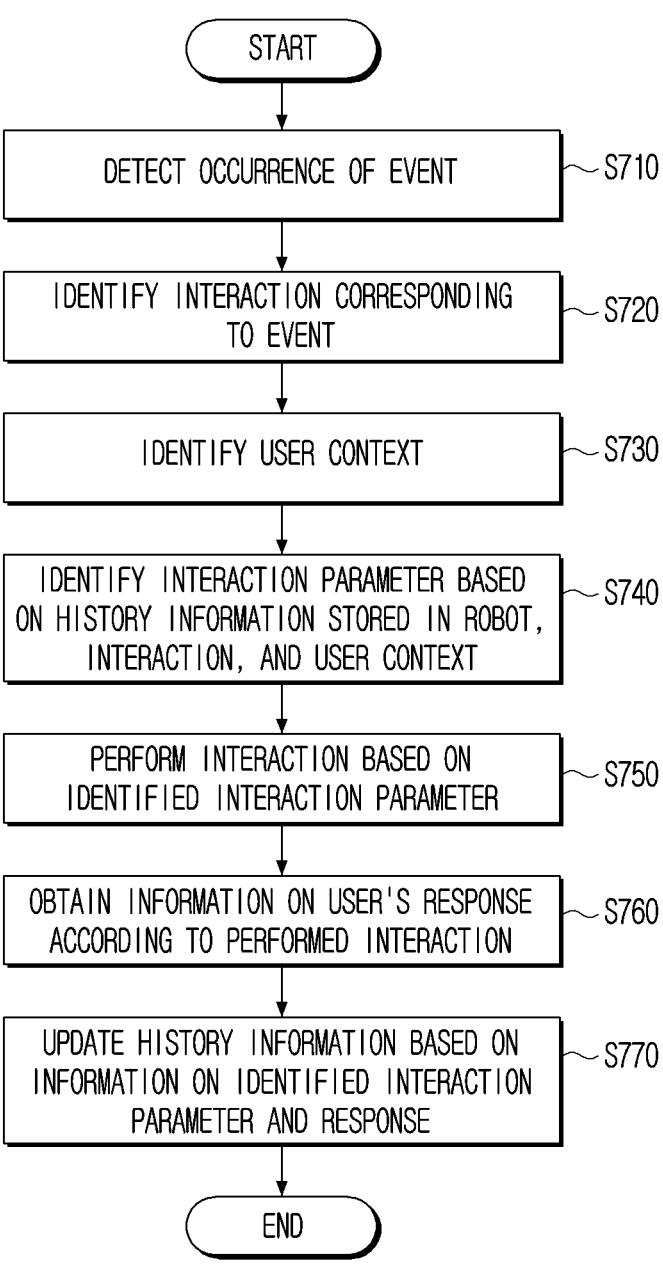
FIG. 7 is a diagram illustrating a method for controlling a robot according to an embodiment of the disclosure.

FIG. 7 is a flowchart illustrating a method for controlling a robot according to an embodiment of the disclosure.

Referring to FIG. 7, the robot 100 may detect occurrence of an event through the at least one sensor 110 in operation S710.

The robot 100 may identify an interaction corresponding to the event in operation S720.

The robot 100 may identify the user context through at least one sensor 110, communication interface 120, or the user interface 130 in operation S730. The robot 100 may identify the user context based on information comprising at least one of the identification information of the user, location information of the user, pose information of the user, weather information, or stock price information of the user.

The robot 100 may identify an interaction parameter based on the history information 171 stored in the robot 100, the identified interaction, and the identified user context in operation S740. The robot 100 may identify an interaction parameter by comparing the history corresponding to the identified interaction and the identified user context among the history information stored in the robot 100 and a threshold value.

Based on the identified interaction parameter, the robot 100 may perform an interaction in operation S750.

The robot 100 may obtain information on the user's response according to the performed interaction in operation S760. Based on user information to obtain information on the user's response being set, the robot 100 may obtain the user's response based on the set user's information, and convert the obtained user's response to the response score of the user.

The robot 100 may update the history information 171 based on the identified interaction parameter and the information on the user response in operation S770. The robot 100 may update history information by removing a duplicate history or incorporating similar histories among a plurality of histories included in the history information.

The term "unit" or "module" used in the disclosure includes units consisting of hardware, software, or firmware, and is used interchangeably with terms, such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including the robot 100 according to the embodiments. When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

According to one or more embodiments of the disclosure, a method disclosed herein may be provided in a computer program product. A computer program product may be traded between a seller and a purchaser as a commodity. A computer program product may be distributed in the form of a machine-readable storage medium (e.g., CD-ROM) or distributed online through an application store (e.g., PLAY-STORE™). In the case of online distribution, at least a portion of the computer program product may be stored temporarily or at least temporarily in a storage medium, such as a manufacturer's server, a server in an application store, or memory in a relay server.

Each of the components (for example, a module or a program) according to one or more embodiments may include one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with embodiments of the disclosure, may be performed sequentially, in a parallel, repetitive, or heuristic manner, or at least some operations may be performed in a different order, omitted, or other operations can be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a robot, the method comprising:

detecting occurrence of an event;

identifying an interaction corresponding to the event;

identifying a user context of a user corresponding to the event;

identifying an interaction parameter based on history information stored in the robot, the interaction, and the user context, wherein the interaction parameter is identified by performing regression on at least one interaction parameter or by using a second history among the history information based on a result of comparing a number of at least one first history corresponding to the interaction and the user context with a first threshold value, or based on a result of comparing a score of a response of the user included in the at least one first history corresponding to the interaction and the user context with a second threshold value;

performing the interaction based on the identified interaction parameter;

obtaining information on a user's response according to a result of the performing of the interaction; and updating the history information based on the information on the identified interaction parameter and the user's response.

2. The method of claim 1, wherein the identifying of the interaction parameter comprises, based on the number of the at least one first history corresponding to the interaction and the user context among the history information being greater than or equal to the first threshold value, identifying the interaction parameter by performing regression on the at least one interaction parameter included in the at least one first history and the score of the response of the user.

3. The method of claim 1, wherein the identifying of the interaction parameter comprises, based on the number of the at least one first history corresponding to the interaction and the user context among the history information being less than the first threshold value, identifying the interaction parameter by using at least one interaction parameter included in the second history among the history information.

4. The method of claim 1, wherein the identifying of the interaction parameter comprises, based on the score of the response of the user included in the at least one first history corresponding to the interaction and the user context among the history information being greater than or equal to the second threshold value, identifying the interaction parameter by performing regression on the at least one interaction parameter included in the at least one first history and the score of the response of the user.

5. The method of claim 1, wherein the identifying of the interaction parameter comprises, based on the score of the response of the user included in the at least one first history corresponding to the interaction and the user context among the history information being less than the second threshold value, identifying the interaction parameter by using at least one interaction parameter included in the second history among the history information.

6. The method of claim 1, further comprising:

updating history information by removing a duplicate history or incorporating similar histories among a plurality of histories included in the history information.

7. The method of claim 1, wherein the identifying of the user context comprises identifying the user context based on information comprising at least one of identification information of the user, location information of the user, pose information of the user, weather information, or stock price information.

8. The method of claim 1, wherein the obtaining of information on the user's response comprises, based on user information to obtain information on the user's response being set:

obtaining the user's response based on set user's information; and converting the obtained user's response into the score of the response of the user.

9. A robot comprising:

at least one sensor;

a driver;

memory storing one or more computer programs; and one or more processors operatively coupled with the at least one sensor, the driver, and the memory, wherein the one or more computer programs include computer-executable instructions that, when executed by the one or more processors individually or collectively, cause the robot to:

detect, through the at least one sensor, occurrence of an event, identify an interaction corresponding to the event, identify a user context of a user corresponding to the event, identify an interaction parameter based on history information stored in the memory, the interaction, and the user context, wherein the interaction parameter is identified by performing regression on at least one interaction parameter or by using a second history among the history information based on a result of comparing a number of at least one first history corresponding to the interaction and the user context with a first threshold value, or based on a result of comparing a score of a response of the user included in the at least one first history corresponding to the interaction and the user context with a second threshold value, control the driver to perform the interaction based on the identified interaction parameter, obtain information on a user's response according to a result of the performing of the interaction, and update the history information based on information on the identified interaction parameter and the user's response.

10. The robot of claim 9, wherein the one or more computer programs further include computer-executable instructions that, when executed by the one or more processors, cause the robot to, based on the number of the at least one first history corresponding to the interaction and the user context among the history information being greater than or equal to the first threshold value, identify the interaction parameter by performing regression on the at least one interaction parameter included in the at least one first history and the score of the response of the user.

11. The robot of claim 9, wherein the one or more computer programs further include computer-executable instructions that, when executed by the one or more processors, cause the robot to, based on the number of the at least one first history corresponding to the interaction and the user context among the history information being less than the first threshold value, identify the interaction parameter by using at least one interaction parameter included in the second history among the history information.

12. The robot of claim 9, wherein the one or more computer programs further include computer-executable instructions that, when executed by the one or more processors, cause the robot to, based on the score of the response of the user included in the at least one first history corresponding to the interaction and the user context among the history information being greater than or equal to the second threshold value, identify the interaction parameter by performing regression on the at least one interaction parameter included in the first history and the score of the response of the user.

13. The robot of claim 9, wherein the one or more computer programs further include computer-executable instructions that, when executed by the one or more processors, cause the robot to, based on the score of the response of the user included in at least one first history corresponding to the interaction and the user context among the history information being less than the second threshold value, identify the interaction parameter by using at least one interaction parameter included in the second history among the history information.

14. The robot of claim 9, wherein the one or more computer programs further include computer-executable instructions that, when executed by the one or more processors, cause the robot to update history information by removing a duplicate history or incorporating similar histories among a plurality of histories included in the history information.

15. The robot of claim 9, wherein the one or more computer programs further include computer-executable instructions that, when executed by the one or more processors, cause the robot to identify the user context based on information comprising at least one of identification information of the user, location information of the user, pose information of the user, weather information, or stock price information.

16. The robot of claim 9, wherein the one or more computer programs further include computer-executable instructions that, when executed by the one or more processors, cause the robot to, based on user information to obtain information on the user's response being set:

obtain the user's response based on set user's information, and convert the obtained user's response into the score of the response of the user.

17. One or more non-transitory computer-readable storage media storing computer-executable instructions that, when executed by one or more processors of a robot individually or collectively, cause the robot to perform operations, the operations comprising:

detecting occurrence of an event;

identifying an interaction corresponding to the event;

identifying a user context of a user corresponding to the event;

identifying an interaction parameter based on history information stored in the robot, the interaction, and the user context, wherein the interaction parameter is identified by performing regression on at least one interaction parameter or by using a second history among the history information based on a result of comparing a number of at least one first history corresponding to the interaction and the user context with a first threshold value, or based on a result of comparing a score of a response of the user included in the at least one first history corresponding to the interaction and the user context with a second threshold value;

performing the interaction based on the identified interaction parameter;

obtaining information on a user's response according to a result of the performing of the interaction; and updating the history information based on the information on the identified interaction parameter and the user's response.

18. The one or more non-transitory computer-readable storage media of claim 17, wherein the identifying of the interaction parameter comprises, based on the number of the at least one first history corresponding to the interaction and the user context among the history information being greater than or equal to the first threshold value, identifying the interaction parameter by performing regression on the at least one interaction parameter included in the at least one first history and the score of the response of the user.

19. The one or more non-transitory computer-readable storage media of claim 17, wherein the identifying of the interaction parameter comprises, based on the number of the at least one first history corresponding to the interaction and the user context among the history information being less than the first threshold value, identifying the interaction parameter by using at least one interaction parameter included in the second history among the history information.

20. The one or more non-transitory computer-readable storage media of claim 17, wherein the identifying of the interaction parameter comprises, based on the score of the response of the user included in at least one first history corresponding to the interaction and the user context among the history information being greater than or equal to the second threshold value, identifying the interaction parameter by performing regression on the at least one interaction parameter included in the first history and the score of the response of the user.

\* \* \* \* \*